United States Patent [19]

Paulicka

[11] 4,235,796

[45] Nov. 25, 1980

[54] PROCESS FOR FRACTIONAL CRYSTALLIZATION OF LIPIDS

[75] Inventor: Fred R. Paulicka, Berea, Ohio

[73] Assignee: SCM Corporation, New York, N.Y.

[21] Appl. No.: 946,090

[22] Filed: Sep. 26, 1978

[51] Int. Cl.³ ............................ C09F 5/10; C11B 3/00

[52] U.S. Cl. ................................ 260/428.5; 260/419; 260/412.8; 422/251; 422/254

[58] Field of Search .................. 260/419, 428.5, 412.8; 422/251, 254; 23/297

[56] References Cited

U.S. PATENT DOCUMENTS

| | | | |
|---|---|---|---|
| 2,757,126 | 7/1896 | Cahn | 196/18 |
| 2,898,271 | 8/1959 | Findlay | 422/254 |
| 3,644,103 | 2/1972 | Yoon et al. | 62/545 |
| 3,645,699 | 2/1972 | Brodie | 23/273 F |
| 3,708,512 | 1/1973 | Alexander et al. | 260/428.5 |
| 4,127,597 | 11/1978 | Craig et al. | 260/428.5 |

OTHER PUBLICATIONS

Swem et al., Bailey's Industrial Oil and Fat Products 3rd Ed. (1964) p. 1011.

*Primary Examiner*—John F. Niebling

*Attorney, Agent, or Firm*—Merton H. Douthitt; Gordon P. Becker; Jerry K. Mueller, Jr.

[57] ABSTRACT

Crystallizable lipid is fractionally crystallized from a fugitive solvent therefor in a crystallization zone wherefrom a washed crystal containing slurry substantially depleted in liquid lipid is withdrawn and the crystals are separated from such washed slurry.

10 Claims, 1 Drawing Figure

PROCESS FOR FRACTIONAL CRYSTALLIZATION OF LIPIDS

CROSS-REFERENCE TO RELATED APPLICATIONS

This application is cross-referenced to applicant's commonly assigned application Ser. No. 946,088 entitled "Process for Fractional Crystallization of Lipids and Recovery of Crystal Fractions," filed Sept. 26, 1978, now abandoned. The disclosure of said application is expressly incorporated herein by reference.

BACKGROUND OF THE INVENTION

The present invention relates to a process for the fractional crystallization of lipids from solvent. Most often the lipid is separated into fractions according to the degree of saturation or acylation of the fractions. In general such fractional crystallization is carried out by dissolving the lipid in a solvent, cooling the resulting solution until a crystalline fraction is formed, and separating the resulting crystalline fraction from remaining liquor. Often the liquor is subjected to a repeat of this process at a lower temperature to obtain one or more additional lipid fractions. Conventionally a lipid crystal crop is separated from its liquor by filtration, most generally using large rotary vacuum filters. These filters constitute a very large investment item in a commercial production plant.

The present invention provides a process for recovering the crystalline fraction from the lipid/solvent solution in relatively simple and efficient fashion. It is based in part on the discovery that a heap of crystals or melt thereof can be accumulated from and in the presence of cold solvent without the crystals tending to redissolve in the solvent, provided that the solvent has been substantially depleted of dissolved lipid. Accordingly, the present invention provides for crystallization of lipid fed to the process concurrently with washing of the previously like-formed lipid crystals in especially efficient fashion which advantageously is done by establishing a countercurrent flow relationship between fresh solvent and the lipid crystals to be recovered, i.e., so the crystals being recovered are contacted with the solvent leanest in dissolved lipid.

BROAD STATEMENT OF THE INVENTION

The present invention is a process for the fractional crystallization of crystallizable lipid from a fugitive solvent therefor, said solvent being appreciably more or less dense than the crystals of said lipid. The process comprises introducing said lipid in liquid state into a crystallization zone having an inlet for said lipid, an outlet for dilute liquor and an outlet for washed crystal-containing slurry, said lipid being introduced at said inlet intermediate between said outlets, said outlets being remote from each other. Solvent as wash is introduced into said zone near said washed slurry outlet, said solvent being at a temperature not exceeding the temperature of said zone, at least a portion of the solvent as wash flowing towards said dilute liquor outlet. Heat is removed from the zone to generate a crystal-containing slurry of lipid crystals solvent and dissolved lipid, the lipid crystals representing a fraction of said crystallizable lipid introduced into said zone. Said crystals are transported in the net direction towards said washed slurry outlet. About said washed slurry outlet is established and maintained a washed crystal-containing slurry substantially depleted of dissolved lipid. The washed slurry is withdrawn from the washed slurry outlet, dilute liquor containing lipid dissolved in solvent is withdrawn from the dilute liquor outlet, and the washed crystals are recovered from the withdrawn washed slurry.

BRIEF DESCRIPTION OF THE DRAWING

The drawing is a flow diagram of the process operated to produce continuously a crystal product which represents a fraction of the crystallizable lipid fed to the process. Instrumentation, controls, feeders, tanks, fittings, valves, and other auxillary appurtenant equipment are not shown but are to be provided where necessary, desirable, or convenient in conventional fashion. Materials of construction for the process are conventional for the type of operation practiced.

DETAILED DESCRIPTION OF THE DRAWING

Figure 1:
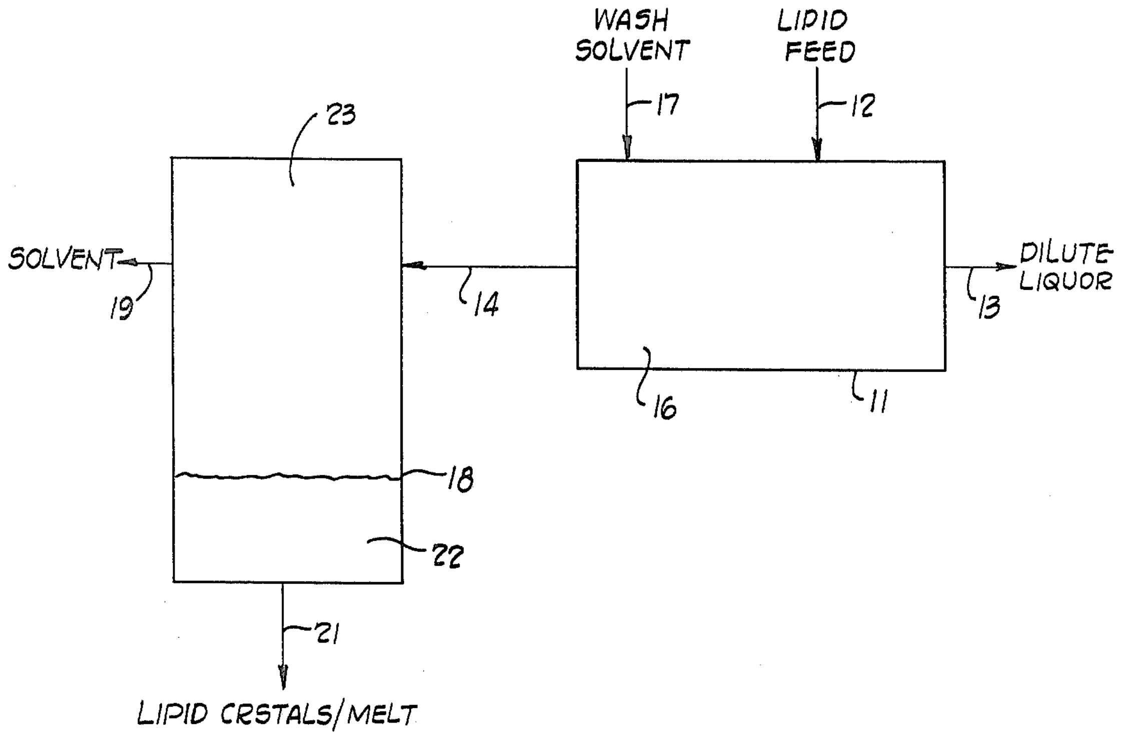

Crystallization zone 11 can comprise a plurality of crystallization stages preferably communicating in serial relationship. Zone 11 is a swept-surface indirectly-cooled unit wherein crystallization and washing of crystals are practiced. Appropriately modified according to the precepts of this invention, a Brodie crystallizer as shown in U.S. Pat. No. 3,645,699 provides an apparent soundly designed unit adaptable for practice of the present invention.

Lipid feed 12 is introduced into zone 11 in liquid state. This means that the lipid is in molten state, or is dissolved in the solvent optionally pre-cooled to provide lipid seed crystals (nuclei) upon which the product crystals of the process can build. Zone 11 is fitted with dilute liquor outlet 13 and washed crystal-containing slurry outlet 14. Lipid feed 12 is introduced to zone 11 between said outlets, which are remote from each other. The precise inlet point in zone 11 where lipid feed 12 is introduced depends upon many factors such as required holding time in zone 11 to generate the desired crystal crop in proportion and crystal size, holding time to effectively wash the generated crystals, ratio of solvent to lipid established in zone 11, type of lipid being fractionated, and other factors.

Wash solvent 17 (the same type of solvent is used throughout the process) is introduced in zone 11 near washed slurry outlet 14 and at least a portion of it passes through zone 11 towards dilute liquor outlet 13. Wash solvent 17 is introduced at a temperature which is the same temperature at which the contents of zone 11 is held or a temperature lower than this, eg. by about 5° to 15°, for example. The proportion of wash solvent 17 fed to zone 11 will depend upon whether any solvent is contained in lipid feed 12 and other factors which will be described below. Heat is removed from zone 11 preferably by passing a refrigerant through a cooling jacket which can be fitted around zone 11 in conventional fashion. The heat removal generates crystal-containing slurry in zone 11 which crystals represent a fraction of the lipid fed to zone 11 in lipid feed 12.

The crystals are transported in a net direction towards washed slurry outlet 14, preferably by mechanical means. Swept-surface blades designed in a screw-like configuration, for example, can transport the crystals in efficient fashion. Since at least a portion of liquid zone 11 flows in a direction towards the dilute liquor outlet 13, there is established in zone 11 a countercurrent relationship between the lipid crystals generated in zone 11 and said liquid flow which is solvent and dissolved lipid with much leaner solvent near washed slurry outlet 14. Depending upon the flow rates of wash solvent 17 and any solvent entering with lipid feed 12, and the amount of liquid permitted to be withdrawn through both outlets 13 and 14, the proportion and flow rate of liquid counter to the direction of net crystal transport will be determined. Since there is a liquid flow towards dilute liquor outlet 13, it is expected that lipid feed 12 will initially flow towards dilute liquor outlet 13 and as crystals are generated and developed they will be transported towards washed slurry outlet 14 save at most for extremely fine crystals which may pass through zone 11 and be withdrawn through dilute liquor outlet 13. Accordingly, such fines are kept to a minimum and/or the liquid flow rate towards dilute liquor outlet 13 should be adjusted and maintained such that the crystals generated in zone 11 are not swept along with such liquid flow.

About washed slurry outlet 14 the slurry is established and maintained to be substantially depleted in dissolved lipid (solvent lean in dissolved lipid). Area 16 of zone 11 depicts the location where this condition obtains. Area 16 desirably may be an ultimate stage of zone 11 where substantially pure solvent devoid of dissolved lipid exists with the washed crystals.

Washed crystal-containing slurry withdrawn from washed slurry outlet 14 is passed into accumulator 18 wherein the crystals accumulate as heap 22 separate from solvent body 23. Solvent body 23 remote from heap 22 is tapped from accumulator 18 through solvent line 19. The crystals will precipitate from the solvent if they are appreciably denser than the solvent and will float in the solvent if less dense than the solvent. Such tapped solvent optionally can be stripped for further purification and advantageously recycled to the process. Optionally, heap 22 of lipid crystals can be melted. As the heap of crystals or melt thereof, the crystals will resist redissolution in the solvent. Of course, the solvent should not be heated or subjected to agitation otherwise conditions for redissolution may become established.

Heap 22 of lipid crystals can be withdrawn through line 21 and stripped of solvent by conventional techniques such as filtration and/or inert gas sparging, or the like conventional procedure. As the melt of crystals from heap 22, such melt will form a substantially distinct layer from solvent 23 for easy and efficient removal from accumulator 18. Again, such withdrawn melt can be liberated of minor amounts of solvent in conventional fashion with the liberated or reclaimed solvent recycled to the process.

Dilute liquor is withdrawn from crystallization zone 11 through dilute liquor outlet 13 and desirably is at least liberated of a portion of the solvent. The dilute liquor can be reheated, if necessary, for subjecting this solution to fractional crystallization for obtaining additional fractions of the lipid dissolved therein, or all the solvent can be removed and the remaining lipid used for other purposes.

DETAILED DESCRIPTION OF THE INVENTION

A wide variety of lipids are suitable for use in the present process. Such lipids include selectively hydrogenated glyceride oils as shown in U.S. Pat. No. 2,972,541 and commonly assigned co-pending application Ser. No. 912,639, filed June 5, 1978 entitled "Lipoidal Compositions, Hard Butter Components, and Improvement in Process for Making the Latter". Further lipids include randomized and co-randomized triglyceride oils. Additional lipids include monoesters of glycerine and propylene glycol in admixture with related esters thereof such as shown in U.S. Pat. No. 4,010,183. Further lipids include fatty acids (i.e. fat-forming acids), other various fatty acid esters, and fatty alcohols, including those derived from animal, vegetable (including nuts), and tall oil and mixed sources. Such lipids all are derived from $C_2$–$C_{26}$ fat-forming acids which can contain varying degrees of unsaturation. Typical of such fat-forming or fatty acids include the acids: lauric, myristic, palmitic, oleic, stearic, butyric, linoleic, behenic, elaidic, and like fatty acids. Such acids in the cis configuration normally are found in natural glyceride oils, fats, and tall oil. Typical glyceride oils include the oils: peanut, cottonseed, corn, soybean, safflower, lard, tallow, palm kernel, sunflower, palm, so-called "low molecular" fats, and the like, and mixtures thereof. The lipid can be deodorized conventionally, eg. by steam deodorization (often under vacuum), or the lipid can be used in the instant process without such deodorization.

The appropriate solvent suitable for use in the instant process is fugitive for separation as a vapor from the residual lipid. For present purposes, a solvent is fugitive if it has a normal boiling point at one atmosphere total pressure of not substantially above about 250° C., advantageously not substantially above about 200° C., and preferably not substantially above about 150° C. The solvent also should be one that will dissolve the lipid to at least about 10 grams per 100 ccs, at a temperature not substantially above about 70° C., which solvent also has less solubility for the lipid and particularly for saturated (or higher melting) components thereof as the temperature of the solution is reduced. Additionally, the solvent is restricted to one having an appreciable density differential from said lipid of at least about 0.05 grams per cc, and advantageously at least about 0.1 grams per cc. Use of solvents having a density less than the density of the lipid permits accumulation of the crop of crystals or melt thereof as a defined, lower, lipid-rich liquid phase, and use of a solvent which has a density greater than the density of the lipid permits such crop of crystals or melt thereof to be accumulated as a defined, upper, lipid-rich liquid phase.

Suitable solvents for use in the present process having a density differential sufficiently less than the lipid include acetone, lower paraffins in a liquid phase such as hexane down to propane, tetrahydrofuran, benzene, and the like. Those solvents having the requisite density differential greater than the lipid include halogenated solvent, carbontetrachloride, chloroform, dimethyl sulfone, and on occasion 1 nitropropane, 2-nitropropane, hexamethylphosphoramide, and N-methyl pyrrolidone, and the like. It should be noted that most lipids have a density which normally ranges from between about 0.925 to about 0.970 gm/cc, and thus some of the listed solvents will serve for some lipids while being only marginally acceptable for other lipids. The preferred solvents for use in the present process include acetone and methyl ethyl ketone based upon the density differential which these solvents have from most lipids.

The weight ratio of solvent to lipid established in the crystallization zone depends upon the solubility of the particular feed mixture in the solvent at elected temperatures and pressures for dissolving the lipid and for separation of the resulting crystals (preferably atmospheric pressure, dissolving at about 40° to 70° C. and cooling down for crystallization to about 0° to 40° C.). Advantageously, the weight ratio of the solvent to the lipid will be between about 2:1 to about 10:1 for efficiency and economy, although ratios above 10:1 can be suitably employed in the instant process. Preferably, such ratio is between about 6:1 and about 10:1. The ratio of solvent to lipid can be established in the crystallization zone by providing all of the solvent from the wash solvent introduced into such zone or a portion of the solvent can come from a solution of the lipid in such solvent fed to the process. The same solvent is used in the process as wash and to dissolve the lipid as a feed for the process.

The temperature at which the crystal-containing slurry is formed in the crystallization zone depends upon the particular lipid and solvent being cooled. Such cooling (or heat removal from the crystallization zone), preferably is done at a rate of about 1° to 5° 1 C. per minute. In the present process, the heat removal and concomitant crystallization of the solution preferably is continued until the average particle size (weight average particle size) of the resulting crystals is at least about 200 mesh (74 microns) but preferably greater than about 140 mesh (105 microns). Such relatively large crystal size, in combination with the preferred density differential between the lipid and the solvent, permits accumulation of a crop of crystals in the presence of the solvent substantially depleted of dissolved lipid in efficient and economic fashion. Desirably, the proportion of dissolved lipid in the washed crystal-containing slurry withdrawn from the crystallization zone is not substantially greater than about 2% by weight of the solvent portion of such slurry.

The heap of crystals accumulated in the accumulation zone can be withdrawn from the accumulator in conventional fashion or such heap of crystals can be melted carefully without turbulence for forming a substantially defined, lipid-rich, liquid phase substantially distinct from the solvent. This lipid-rich, liquid phase then can be tapped from the accumulation zone. Provided that the solvent is substantially depleted in dissolved lipid (conditions for re-dissolution are not established, such as not heating the solvent to the melting point of the crystals and the solvent is not severely agitated), the heap of crystals or melt thereof will substantially resist redissolution in the solvent which makes for efficient and relatively easy separation of the crystals from the solvent. In the accumulation zone, suitably the solvent is withdrawn at a point in the zone remote from the point at which the crystals or melt thereof are withdrawn from the accumulation zone in order to provide the maximum accumulation or separation time of the crystal from the solvent. It can be advantageous on occasion also to provide the accumulation zone with mechanical assistance to gravity for speeding the accumulation of the crop of crystals. Suitably, centrifuge or Podbielniak separator or the like can provide such assistance. Use of tangential injection of the slurry into the accumulation zone or other conventional features of hydraulic cyclone design may be used for static separation also.

Solvent removal from the dilute liquor or from the lipid crystals or melt thereof advantageously can be practiced by heating for volatilization of the solvent, optionally practiced under vacuum. Additionally, inert gas sparging can effectively assist in removing trace amounts of the solvent remaining in the lipid crystals such as practiced in U.S. Pat. No. 4,010,183.

I claim:

1. A process for the fractional crystallization of crystallizable lipid from a fugitive solvent therefore, said solvent being appreciably more or less dense than the crystals of said lipid, which comprises:

introducing said lipid in liquid state into a crystallization zone having an outlet for dilute liquor and an outlet for washed crystal-containing slurry, said lipid introduced at an inlet intermediate between said outlets, said outlets being remote from each other;

introducing said solvent as wash into said zone near said washed slurry outlet, said solvent as wash being at a temperature not exceeding the temperature of said zone, and in a liquid phase throughout said zone, at least a portion of said solvent as wash flowing towards said dilute liquor outlet;

removing heat from said zone to generate a crystal-containing slurry of lipid crystals, solvent, and dissolved lipid, said lipid crystals representing a fraction of said crystallizable lipid introduced into said zone;

transporting said crystals in a net direction towards said washed slurry outlet;

establishing and maintaining about said washed slurry outlet a washed crystal-containing slurry substantially depleted of dissolved lipid;

withdrawing said washed slurry from said washed slurry outlet;

withdrawing dilute liquor containing lipid dissolved in solvent from said dilute liquor outlet; and recovering washed crystals from said withdrawn washed slurry.

2. The process of claim 1 wherein the density difference between said solvent and said crystals is at least about 0.05 gm/cc.

3. The process of claim 2 wherein said solvent is methyl ethyl ketone.

4. The process of claim 2 wherein said solvent is acetone.

5. The process of claim 1 wherein said lipid comprises a glyceride or a fatty acid.

6. The process of claim 5 wherein said lipid is a triglyceride.

7. The process of claim 1 wherein said washed crystal-containing slurry about said washed slurry outlet contains not substantially more than about 2% dissolved lipid by weight.

8. The process of claim 1 wherein said lipid is introduced into said crystallization zone in molten state.

9. The process of claim 1 wherein said lipid is introduced into said crystallization zone as a solution thereof in said solvent.

10. The process of claim 1 wherein said lipid introduced into said crystallization zone contains nucleating lipid seed crystals.

* * * * *

UNITED STATES PATENT AND TRADEMARK OFFICE
CERTIFICATE OF CORRECTION

PATENT NO. : 4,235,796
DATED : Nov. 25, 1980
INVENTOR(S) : Fred R. Paulicka

It is certified that error appears in the above-identified patent and that said Letters Patent are hereby corrected as shown below:

Item 56 under OTHER PUBLICATIONS: "Swem" should read --Swern--.

In the Drawing: "Lipid Crstals/Melt" should read --Lipid Crystals/Melt--.

Col. 3, l. 24 : "obtains" should read --occurs--.

Col. 4, l. 53 : "1 nitropropane" should read --1-nitropropane--.

Col. 5, l. 17 : after 5°, delete "1".

Signed and Sealed this

*Tenth* Day of *March 1981*

[SEAL]

*Attest:*

RENE D. TEGTMEYER

*Attesting Officer* *Acting Commissioner of Patents and Trademarks*